(12) United States Patent
Ichikawa et al.

(10) Patent No.: US 6,736,918 B1
(45) Date of Patent: May 18, 2004

(54) PROCESS FOR PRODUCING CARDS

(75) Inventors: Akira Ichikawa, Tokyo (JP); Kenichi Watanabe, Tokyo (JP)

(73) Assignee: Lintec Corporation, Tokyo (JP)

( * ) Notice: Subject to any disclaimer, the term of this patent is extended or adjusted under 35 U.S.C. 154(b) by 3 days.

(21) Appl. No.: 09/830,490

(22) PCT Filed: Jun. 30, 2000

(86) PCT No.: PCT/JP00/04335

§ 371 (c)(1),
(2), (4) Date: Apr. 27, 2001

(87) PCT Pub. No.: WO01/16878

PCT Pub. Date: Mar. 8, 2001

(30) Foreign Application Priority Data

Aug. 31, 1999 (JP) .............................. 11/244161

(51) Int. Cl.⁷ .................. B32B 31/06; B32B 31/08; B32B 31/12; B32B 31/20; B32B 35/00

(52) U.S. Cl. .................. 156/182; 156/184; 156/289; 264/261; 340/572.1

(58) Field of Search ................ 156/182, 184, 156/289; 264/261, 271.1, 271.11, 272.11, 272.14; 340/572.1, 910; 705/41, 20

(56) References Cited

U.S. PATENT DOCUMENTS 5,841,350 A * 11/1998 Appalucci et al. ....... 340/572.3

FOREIGN PATENT DOCUMENTS

| JP | 11(1994)-122297 A | 5/1994 | |
| JP | 10-302040 | * 11/1998 | ......... G06K/19/077 |
| JP | 11161760 A | * 6/1999 | ......... G06K/19/077 |
| JP | 11(19999)-221986 A | 8/1999 | |

OTHER PUBLICATIONS

Machine translation of JP 10–302040.*

* cited by examiner

Primary Examiner—Richard Crispino
Assistant Examiner—Sing Chan
(74) Attorney, Agent, or Firm—Webb Ziesenheim Logsdon Orkin & Hanson, P.C.

(57) ABSTRACT

A process for producing cards is provided, which can avoid exposure, on card surface, of unevennesses of components such as IC chips, capacitors and antenna coils mounted or formed on a mount substrate. This process comprises the steps of continuously feeding a mount substrate and simultaneously feeding a pair of sheet members on both surface sides of the mount substrate in such a manner that the mount substrate is interposed between the pair of sheet members; feeding an adhesive in fluid condition between each of the surfaces of the mount substrate and the sheet member opposite thereto; and regulating a distance between the pair of sheet members into a constant spacing and hardening the adhesive.

3 Claims, 6 Drawing Sheets

PROCESS FOR PRODUCING CARDS

TECHNICAL FIELD

The present invention relates generally to a process for producing IC (integrated circuit) cards. More particularly, the present invention relates to a process for producing cards, which can avoid exposure, on the card surface, of unevennesses of components such as IC chips, capacitors and antenna coils mounted or formed on a mount substrate.

BACKGROUND ART

In conformity with the rapid progress of electronic application technology, thin high-performance IC cards with large storage capacity are now increasingly employed for instantaneously carrying out inputs and outputs for information storage and processing with external memory units in the field of personal recognition, management of bank deposits, examination of railway tickets, supervision at expressway tollbooths, etc. Among various IC cards, especially, noncontact-type IC cards enable performing information inputs and outputs through wave transmission and reception even at a given distance without the need to carry out time-consuming operation, such as card insertion in a reader installed on an external processor side, for information input and output as different from conventional contac-type IC cards. Therefore, contactless type IC cards are now becoming mainstream because of excellent operation efficiency, accuracy in information input and output and extremely high information processing speed.

Common IC cards are obtained by first overlaying one surface of a substrate of a synthetic resin film such as a film of polyethylene terephthalate with circuits with the use of a copper foil, a silver paste or the like, subsequently superimposing IC chips, capacitors, antenna coils, etc. on the circuits, and covering the circuit side of the substrate with a laminate film having on its one side a heat sensitive or pressure sensitive adhesive layer.

However, these IC cards have a drawback in that unevennesses of components such as IC chips and capacitors are exposed on the laminate film.

Thus, IC cards of the following structure intended to minimize component unevennesses on the cards have been developed.

The IC cards 120, as shown in FIG. 6, fundamentally, comprise a mount substrate 12 of a synthetic resin film 100 such as a film of polyethylene terephthalate, and transmission/reception coils 102 for transmitting and receiving input/output wave signals and capacitors 104 on the surface of the mount substrate 12. The mount substrate 12 has device holes 114 wherein integrated circuits (IC chips) 106, such as semiconductor memory, for information storage and processing are fitted. Copper foil circuits 108 for wiring provided to form circuits between components are stuck to the mount substrate 12 through an adhesive layer 112. Both surface sides of the mount substrate 12 are overlaid, by hot laminating, with laminate films 110 having a thermal adhesive layer 109.

However, with respect to the IC cards of this structure, there still remains the problem that unevennesses of components such as transmission/reception coils 102, capacitors 104, IC chips 106 and copper foil circuits 108 for wiring are exposed on the surfaces of the laminate films 110. Therefore, in the event of printing a company name or other information on a card surface, it is difficult to use conventional printers. Special printers such as an ink jet printer must be employed.

Further, in the event that unevennesses of, for example, IC chips are exposed on IC card surfaces, there is such a danger that IC chips and other components are damaged by impact on the unevennesses when the IC cards are placed in a bag or the like and carried. As a result, reading of read information cannot be performed.

Still further, it is needed to disenable recognition of the presence of components such as IC chips in the IC cards for the purpose of prohibiting alteration of information stored in the IC cards.

SUMMARY OF THE INVENTION

In these circumstances, it is an object of the present invention to provide a process for producing cards, which can avoid exposure, on card surface, of ,unevennesses of components such as IC chips, capacitors and antenna coils mounted or formed on a mount substrate.

The present invention has been made with a view toward attainment of the above problems and object. The process for producing cards according to the present invention comprises the steps of:

continuously feeding a mount substrate and simultaneously feeding a pair of sheet members on both surface sides of the mount substrate in such a manner that the mount substrate is interposed between the pair of sheet members;

feeding an adhesive in fluid condition between each of the surfaces of the mount substrate and the sheet member opposite thereto; and regulating a distance between the pair of sheet members into a constant spacing and hardening the adhesive.

By virtue of this process, the unevennesses of components, such as IC chips, capacitors and antenna coils, mounted or formed on a mount substrate are absorbed by the adhesive in fluid condition, and their exposure on the card surfaces can be avoided.

Therefore, a company name or other information can be printed on a card surface by the use of conventional printers without the need to employ special printers such as an ink jet printer. Further, even when the IC cards are placed in a bag or the like and carried, no impact would be exerted on components such as IC chips. Thus, the components are protected, and damaging of the IC cards can be avoided. Still further, the presence of components such as IC chips in the IC cards cannot be recognized from outside, so that alteration of information stored in the IC cards can be prevented.

In the process for producing cards according to the present invention, one of the pair of sheet members preferably consists of a release sheet.

As a result, an adhesive layer can be exposed by stripping the release sheet from the produced IC cards, and the IC cards can be stuck to, for example, a surface of corrugated cardboard box through the exposed adhesive layer as contactless-type IC labels. Thus, the IC cards can be utilized in the information management for physical distribution system and the like.

Moreover, with respect to the process for producing cards according to the present invention, it is preferred that at least one of the pair of sheet members consist of a release sheet, and that the process further comprise the steps of stripping the release sheet from the mount substrate after the hardening of the adhesive; and sticking a laminate sheet member onto adhesive layer surface exposed as a result of the stripping of the release sheet.

In this process, an adhesive layer can be formed on a surface of mount substrate in advance by the use of release sheet, and thereafter a laminate sheet member suitable for laminating can be stuck thereby to the mount substrate.

DETAILED DESCRIPTION OF THE INVENTION

Embodiments of the present invention will now be described with reference to the appended drawings.

Figure 1:
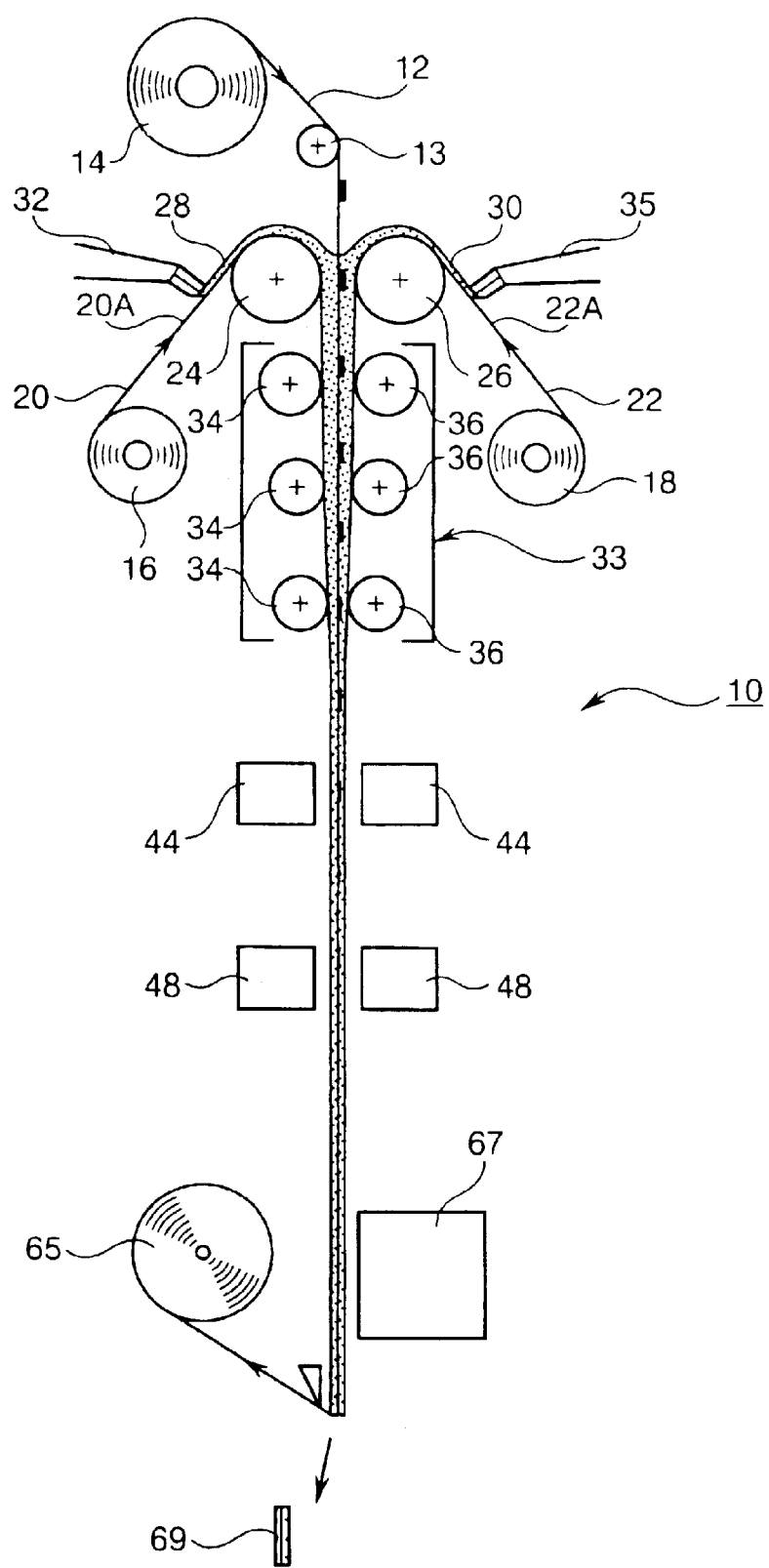
FIG. 1 is a schematic diagram showing the first embodiment of the process for producing cards according to the present invention.

FIG. 1 is a schematic diagram showing the first embodiment of the process for producing cards according to the present invention.

Referring to FIG. 1, numeral 10 generally denotes an apparatus for producing cards of the present invention (hereinafter referred to simply as "cards").

Figure 6:
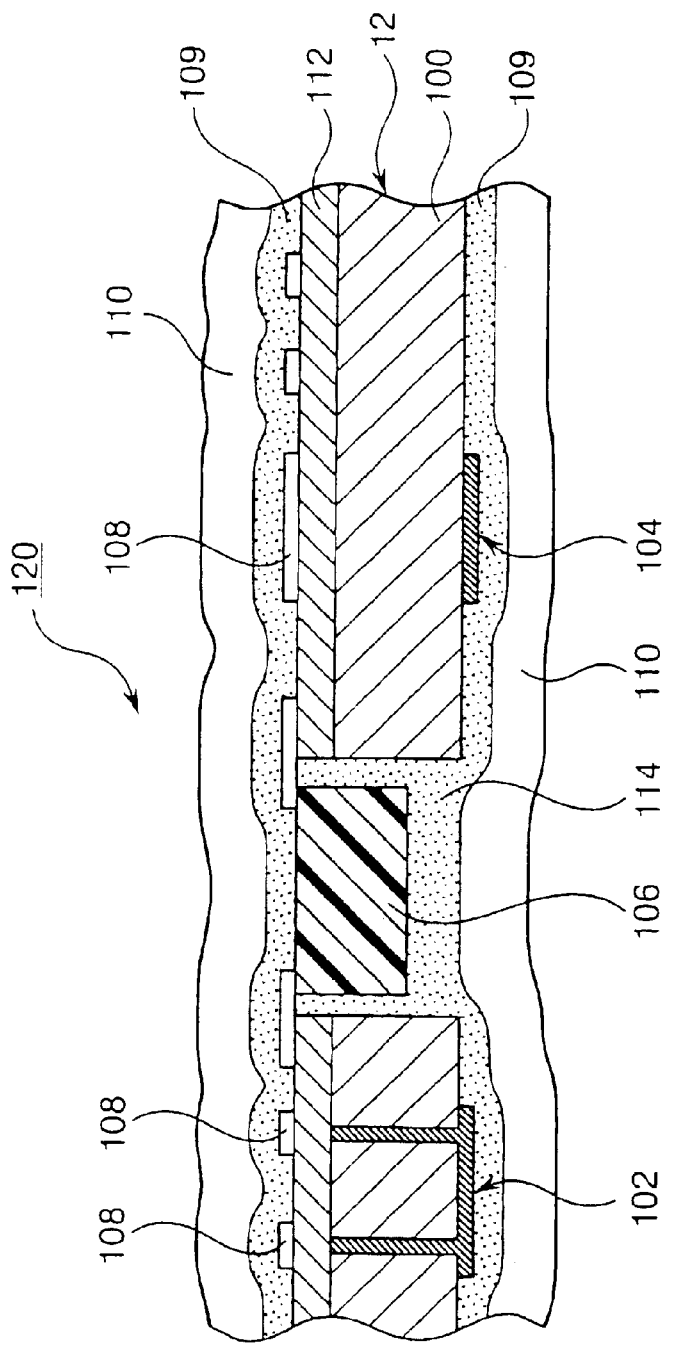
FIG. 6 is a partial enlarged sectional view of conventional IC card.

A mount substrate 12 on which the same IC chips, capacitors, antenna coils, circuits, etc. are formed or superimposed, as in the conventional structure of FIG. 6, is fed from a delivery roll 14 via a guide roll 13.

A pair of sheet member supply rolls 16, 18 are provided on both right and left surface sides of the mount substrate 12. Sheet members 20, 22 are respectively fed from the sheet member supply rolls 16, 18 via a pair of guide rolls 24, 26.

Sheets of synthetic resins such as polyethylene terephthalate and polycarbonate are preferably used as the sheet members 20, 22. From the viewpoint of printability and prohibition of recognition of components such as IC chips, it is preferred that the sheet members 20, 22 be composed of, for example, a white or otherwise colored resin. It is also preferred that the thickness thereof should be in the range of 30 to 200 μm. The sheet members 20, 22 are not limited to the above synthetic resin sheet, and can naturally be composed of papers such as an impregnated paper and a synthetic paper. Furthermore, the later mentioned release sheets (obtained by coating one surface side of, for example, a synthetic resin sheet or an impregnated paper with a release treatment agent such as a silicone resin).

The feeding speed of the sheet members 20, 22 from the sheet member supply rolls 16, 18 is synchronized with the feeding speed of the mount substrate 12 from the mount substrate delivery roll 14. The feeding speed is set for, for example, 5 to 20 m/min.

Further, an adhesive 28, 30 in fluid condition is fed over respective surfaces 20A, 22A of the sheet members 20, 22 delivered from the sheet member supply rolls 16, 18 through adhesive supply means 32, 35 such as die coaters or T-dies.

After the application of the adhesive 28, 30 in fluid condition over the respective surfaces 20A, 22A of the sheet members 20, 22, the sheet members 20, 22 are guided by means of the pair of guide rolls 24, 26 so that he mount substrate 12 is interposed between the sheet members 20, 22 and so that the spaces defined by both surface sides of the mount substrate 12 and the sheet members 20, 22 are filled with the adhesive 28, 30.

Although the adhesive in fluid condition for use is not particularly limited as long as the adhesive has fluidity before hardening but, after hardening, exhibits adherence and stickiness. Hot melt adhesives composed of, for example, a polyolefin resin (such as polyethylene resin or polypropylene resin), a polyester resin and a vinyl acetate resin; and adhesives hardenable by ionizing radiation such as ultraviolet light or electron beams, composed of, for example, a urethane acrylate resin and a polyester acrylate resin can be preferably used.

In the embodiment of FIG. 1, a hot melt adhesive is employed as the adhesive 28, 30.

The feeding rate of adhesive 28, 30 is controlled in conformity with the desired thickness and sheet feed speed. The gap between the guide rolls 24, 26, although not particularly limited, ranges from millimeters to centimeters, preferably, for example, 5 mm to 5 cm.

After the spaces defined by both surface sides of the mount substrate 12 and the sheet members 20, 22 are filled with the adhesive 28, 30, the mount substrate 12 overlaid through the adhesive 28, 30 with the sheet members 20, 22 is passed through a sheet spacing regulator 33 so that the distance between the sheet members 20, 22 is regulated into a constant spacing. This constant spacing attained by the regulation, although depending on the card thickness, is preferably set so that unevennesses of components such as IC chips can be absorbed and sealed by theadhesive 28, 30.

Figure 2:
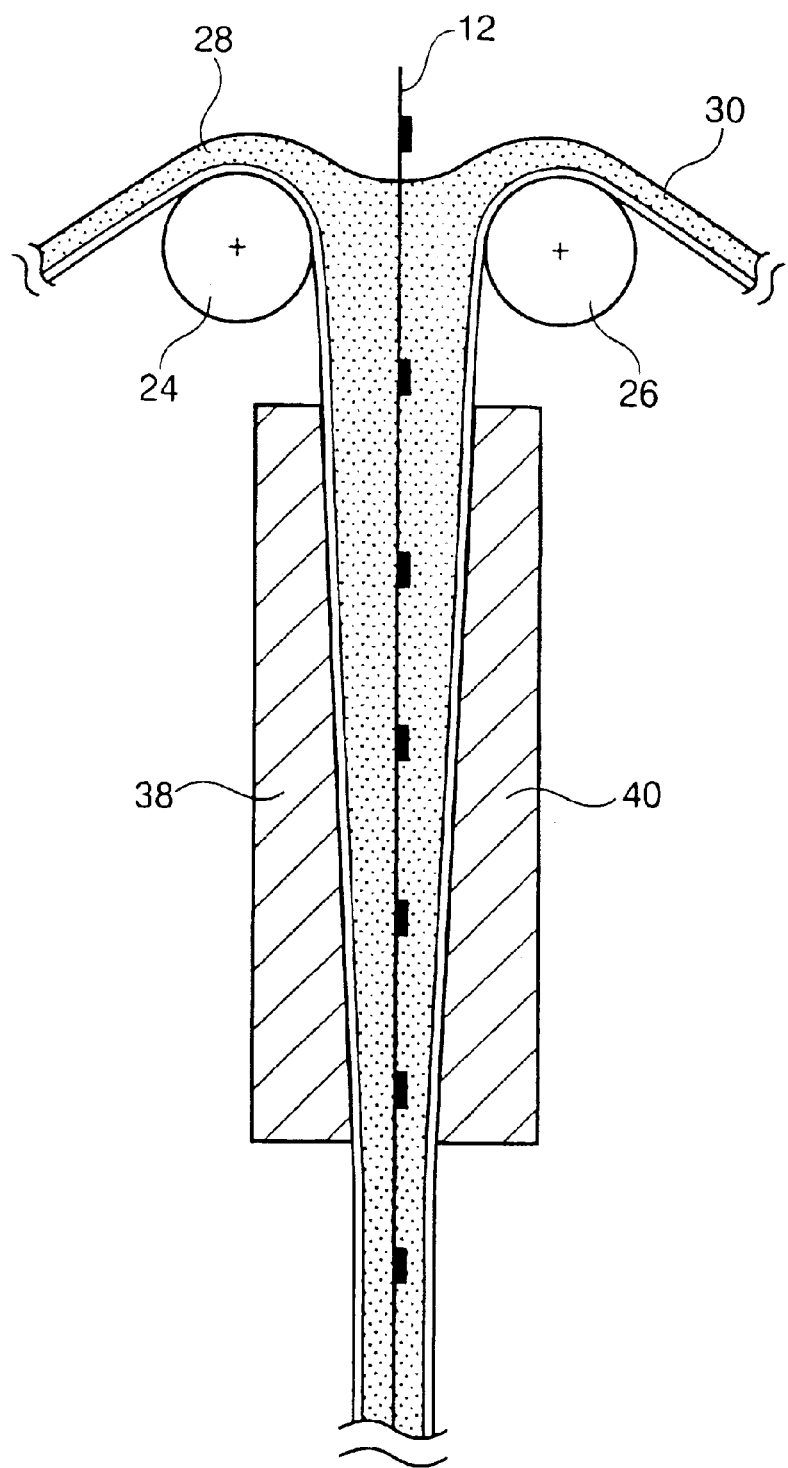
FIG. 2 is a schematic diagram showing a sheet spacing regulator for use in the process for producing cards according to the present invention.

In this embodiment, the sheet spacing regulator 33 comprises three pairs of regulation rolls, each pair consisting of regulation rolls 34, 36 disposed right and left with a gap, arranged so that the gaps are gradually regulated into the constant spacing. Although three pairs of regulation rolls are employed in this embodiment, the sheet spacing regulator 33 can naturally consist of a pair of regulation rolls, two pairs of regulation rolls, or more pairs of regulation rolls. Further, although pairs of regulation rolls 34, 36 disposed right and left are employed in this embodiment, as shown in FIG. 2, the sheet spacing regulator 33 can instead consist of a pair of regulation plates 38, 40 whose gap is gradually regulated into the constant spacing.

In the use of a hot melt adhesive, the adhesive supply means 32, 35 through the sheet spacing regulator 33 must be warmed in order to maintain the fluid condition.

After the regulation of the distance between the sheet members 20, 22 into the constant spacing, the mount substrate 12 overlaid through the adhesive 28, 30 with the sheet members 20, 22 is passed through a first cooler 44 and a second cooler 48 so that the adhesive 28, 30 is hardened.

Although coolers of the air cooling or water cooling system can be used as the coolers 44, 48, the use thereof can be avoided in the event that natural cooling is satisfactory.

Thereafter, the mount substrate 12 overlaid through the adhesive 28, 30 with the sheet members 20, 22 is subjected to punching into IC card configuration by means of a card punching device 67 to thereby obtain IC cards 69 as a final product. The rest after the punching is wound round a take-up roll 65.

Figure 3:
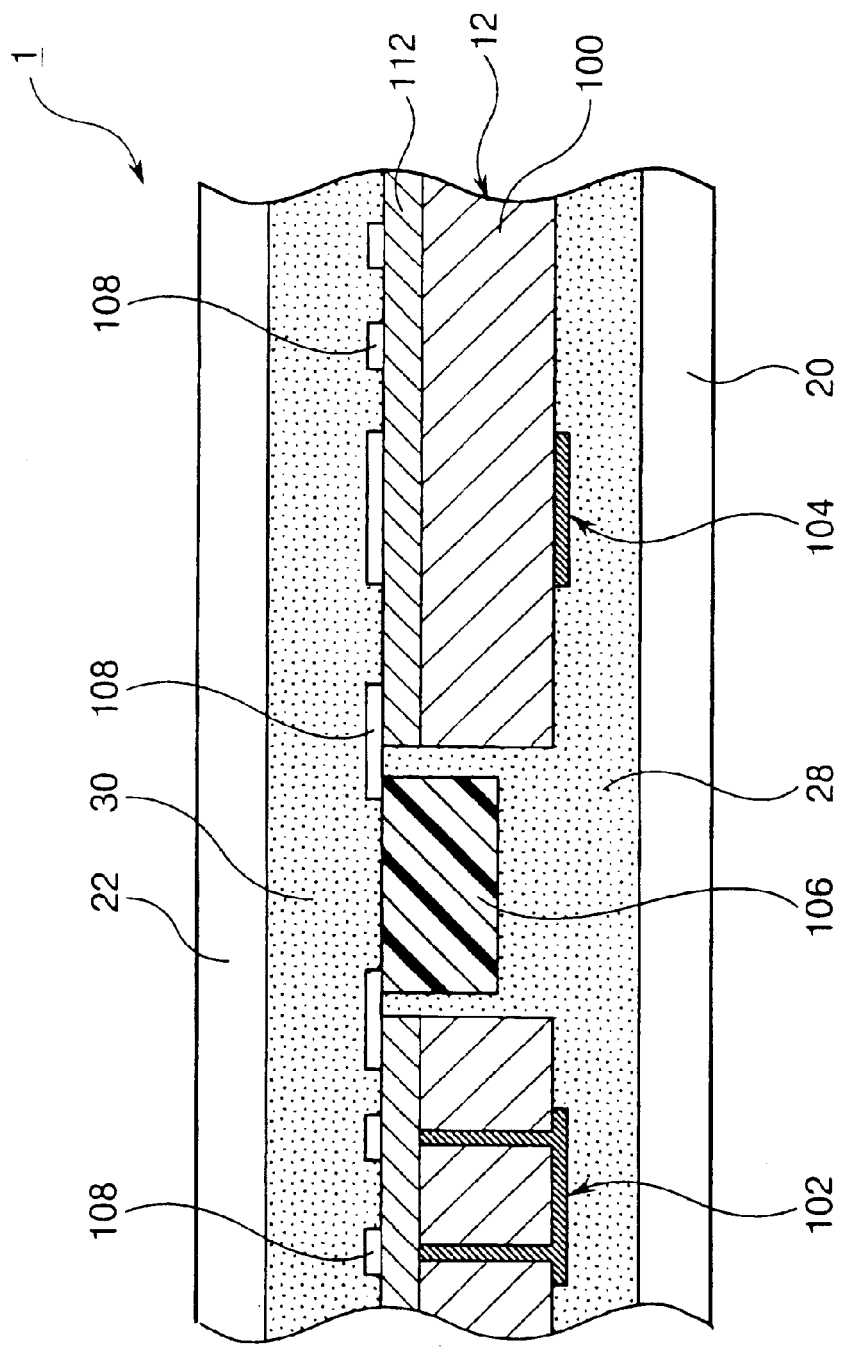
FIG. 3 is a partial enlarged sectional view of an IC card obtained by the first embodiment of the process for producing cards according to the present invention.

As a result, IC cards 1 as shown in. FIG. 3 are obtained (like numerals are employed for like constituent members through the IC cards of the present invention and the conventional IC cards, this being true hereinafter).

Figure 4:
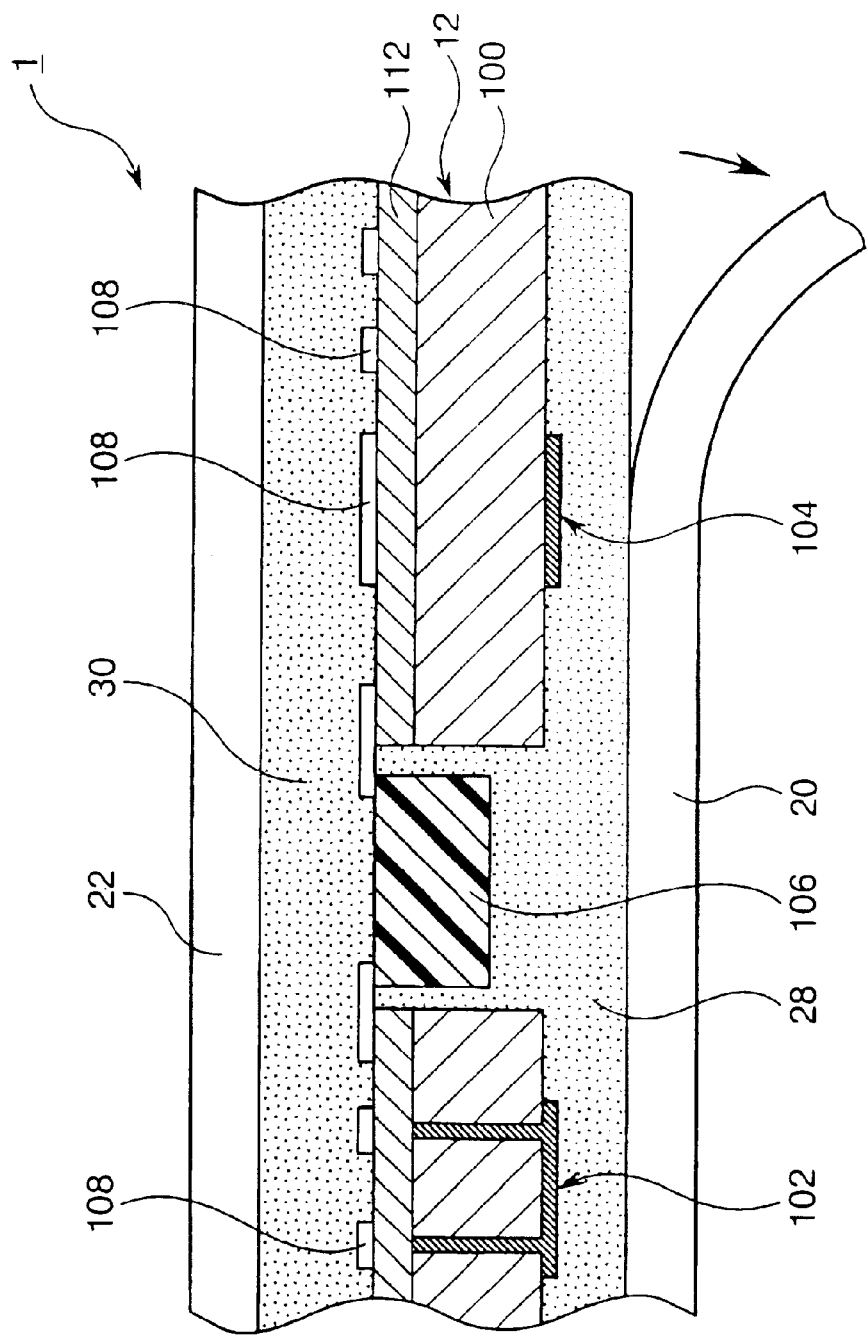
FIG. 4 is a partial enlarged sectional view of an IC card obtained by another embodiment of the process for producing cards according to the present invention.

In this embodiment, as shown in FIG. 4, one of the pair of sheet members 20, 22 (sheet member 20 in FIG. 4) can be composed of a release sheet. In this instance, after the card is formed, an adhesive layer can be exposed by stripping the release sheet from the produced IC cards, so that the IC cards can be stuck to, for example, a surface of a corrugated cardboard box through the exposed adhesive layer as IC labels. Thus, the IC cards can be utilized in the information management for a physical distribution system and the like.

Figure 5:
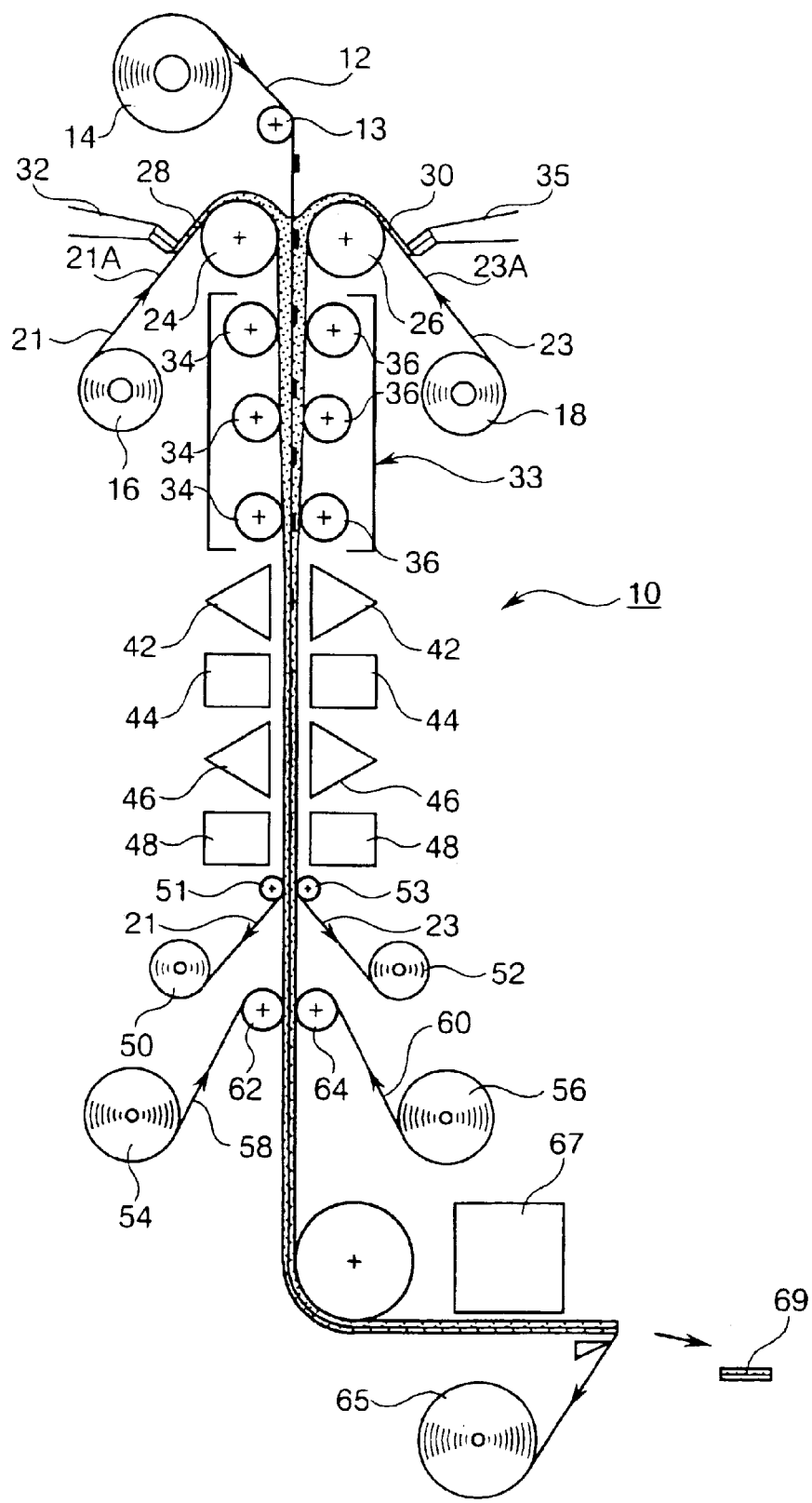
FIG. 5 is a schematic diagram showing the second embodiment of the process for producing cards according to the present invention.

FIG. 5 is a schematic diagram showing the second embodiment of the process for producing cards according to the present invention.

The constitution thereof is fundamentally the same as that of the first embodiment. Like reference numerals are employed for like constituents through the first embodiment and the second embodiment, and repetition of detailed explanation is avoided.

In this embodiment, release sheets 21, 23 as sheet members 20, 22 are respectively fed from sheet member supply rolls 16, 18 via a pair of guide rolls 24, 26.

The release sheets 21, 23 delivered from the sheet member supply rolls 16, 18 have respective release-treated surfaces 21A, 23A. An adhesive in fluid condition 28, 30, such as an adhesive hardenable by ionizing radiation, for example, ultraviolet light, is fed over the release-treated surfaces 21A, 23A through adhesive supply means 32, 35 such as die coaters or T-dies.

The distance between the release sheets 21, 23 is regulated into a constant spacing by a sheet spacing regulator 33. Thereafter, the mount substrate 12 overlaid through the adhesive 28, 30 with the release sheets 21, 23 is passed through a first ultraviolet irradiator 42. Thus, the adhesive 28, 30 is irradiated with ultraviolet light with the result that the adhesive 28, 30 is preliminarily hardened into a semihardened form. The mount substrate 12 overlaid through the adhesive 28, 30 with the release sheets 21, 23 is cooled by means of a first cooler 44 so as to remove any reaction heat generated by the preliminary hardening.

Further, after the cooling by means of the first cooler 44, the mount substrate 12 overlaid through the adhesive 28, 30 with the release sheets 21, 23 is passed through a second ultraviolet irradiator 46. Thus, the adhesive 28, 30 is irradiated with ultraviolet light with the result that the adhesive 28, 30 is hardened. Thereafter, the mount substrate 12 overlaid through the adhesive 28, 30 with the release sheets 21, 23 is cooled by means of a second cooler 48 so as to remove any reaction heat generated by the hardening.

The ultraviolet irradiation in two stages for hardening, as compared with that in one stage, is effective in preventing the waving, warpage and unevenness occurrence of adhesive layers and sheet members caused by reaction heat.

It is preferred that the ultraviolet intensity of the first ultraviolet irradiator 42 should be so set that the adhesive 28, 30 is preliminarily hardened into a semihardened form. On the other hand, the ultraviolet intensity of the second ultraviolet irradiator 46 is preferably so set that the adhesive 28, 30 is completely hardened.

When the reaction heat is slight depending on the type of adhesive, it is not necessary to provide coolers.

Although the adhesive 28, 30 is irradiated with ultraviolet in two stages in this embodiment, the ultraviolet irradiation can naturally be performed in three or more stages, or a single stage.

In this embodiment, because the adhesive 28, 30 must be hardened through the release sheets 21, 23, the release sheets 21, 23 are preferably selected from among films of transparent resins permeable for ultraviolet, such as polyethylene terephthalate and polycarbonate. Although the thickness of the release sheet is not particularly limited, from the viewpoint of strength and dimensional stability, it is preferred that the release sheet have a thickness of 20 to 150 $\mu$m.

After the hardening of adhesive 28, 30 and removal of hardening reaction heat, the release sheets 21, 23 stuck on both surface sides of the mount substrate 12 are stripped by means of a pair of stripping guide rolls 51, 53 and wound round a pair of take-up rolls 50, 52. After the release sheets 21, 23 are stripped off, laminate sheets 58, 60 are fed from a pair of laminate sheet ember supply rolls 54, 56 to a gap between a pair of pressure bonding rolls 62, 64. As a result, the laminate sheets 58, 60 are stuck to the mount substrate 12 by virtue of the adherence of the adhesive 28, 30.

In this embodiment, a variety of sheets including the same sheets as the above sheet members 20, 22 can be used as the laminate sheets 58, 60.

After the sticking of the laminate sheets 58, 60, the mount substrate 12 overlaid through the adhesive 28, 30 with the laminate sheets 58, 60 is subjected to punching into IC card configuration by means of a card punching device 67 to thereby obtain IC cards 69 as a final product. The rest after the punching is wound round a take-up roll 65.

As a result, IC cards 1 as shown in FIG. 3 are obtained.

In this second embodiment, the cards can be produced by sticking the laminate sheets after the hardening of adhesive layers on both surface sides of the mount substrate 12. Therefore, in this embodiment, laminate sheets which cannot be easily brought into direct contact with the adhesive in fluid condition or laminate sheets composed of ultravioletimpermeable papers or colored films can be used.

In this embodiment as well, in the same manner as in the first embodiment, a release sheet can be used as one of the laminate sheets 58, 60, or either of the release sheets 21, 23 can be left unstripped without performing lamination at one side. In such an instance, the same IC cards as in FIG. 4 can be produced which can be stuck to, for example, a surface of a corrugated cardboard box as IC labels. Thus, the IC cards can be utilized in information management for a physical distribution system and the like.

The above-described embodiments of the present invention, however, in no way limit the scope of the present invention. For example, although the above embodiments relate to a vertically arranged system, the present invention can also be applied by a horizontally arranged system. Further, although the same adhesive resin was employed in the adhesive 28, 30 in the above embodiments, different types of adhesive resins can be applied therein. Still further, the cards are not limited to IC cards, and the present invention can be applied for card-shaped products based on mount substrates with uneven surfaces.

In the process for producing cards according to the present invention, the unevennesses of components, such as IC chips, capacitors and antenna coils, mounted or formed on a mount substrate are absorbed by the adhesive in fluid condition, and their exposure on the card surfaces can be avoided.

Therefore, a company name or other information can be printed on a card surface by the use of conventional printers without the need to employ special printers such as an ink jet printer. Further, even when the IC cards are placed in a bag or the like and carried, no impact would be exerted on components such as IC chips. Thus, the components are protected, and damaging of the IC cards can be avoided. Still further, the presence of components such as IC chips in the IC cards cannot be recognized from outside, so that alteration of information stored in the IC cards can be prevented.

What is claimed is:

1. A process for producing IC cards, comprising the steps of:

continuously feeding a mount substrate having unevenness of components on the surface thereof and simultaneously feeding a pair of sheet members on both surface sides of the mount substrate in such a manner that the mount substrate is interposed between the pair of sheet members;

feeding an adhesive in fluid condition on the surface of the sheet members; and regulating a distance between the pair of sheet members into a constant spacing and hardening the adhesive by interposing the mount substrate between the surfaces of the sheet members on which the adhesive is fed, wherein the distance between the sheet members is narrowed gradually.

2. A process for producing IC cards, comprising the steps of:

continuously feeding a mount substrate and simultaneously feeding a pair of sheet members on both surface sides of the mount substrate in such a manner that the mount subs is interposed between the pair of sheet members;

feeding an adhesive in fluid condition on the surface of the sheet members; and regulating a distance between the pair of sheet members into a constant spacing and hardening the adhesive by interposing the mount substrate between the surfaces of the sheet members on which the adhesive is fed, wherein one of the pair of sheet members consists of a release sheet.

3. A process for producing IC cards, comprising the steps of:

continuously feeding a mount substrate and simultaneously feeding a pair of sheet members on both surface sides of the mount substrate in such a manner that the mount substrate is interposed between the pair of sheet members, wherein at least one of the pair of sheet members consists of a release sheet;

feeding an adhesive in fluid condition on the surface of the sheet members;

regulating a distance between the pair of sheet members into a constant spacing and hardening the adhesive by interposing the mount substrate between the surfaces of the sheet members on which the adhesive is fed;

stripping the release sheet from the mount substrate after the hardening of the adhesive; and sticking a laminate sheet member onto adhesive layer surface exposed as a result of the stripping of the release sheet.

* * * * *

UNITED STATES PATENT AND TRADEMARK OFFICE
CERTIFICATE OF CORRECTION

PATENT NO.     : 6,736,918 B1
DATED          : May 18, 2004
INVENTOR(S)    : Ichikawa et al.

It is certified that error appears in the above-identified patent and that said Letters Patent is hereby corrected as shown below:

Title page,
Item [56], References Cited, FOREIGN PATENT DOCUMENTS, "JP   11(19999)" should read -- JP       11(1999) --.

Column 3,
Line 3, "BRIEF DESCRIPTION OF THE DRAWING" should read -- BRIEF DESCRIPTION OF THE DRAWINGS --.

Column 7,
Line 29, "that the mount subs" should read -- that the mount substrate --.

Signed and Sealed this

Thirtieth Day of November, 2004

JON W. DUDAS
*Director of the United States Patent and Trademark Office*